(12) United States Patent
Wei (10) Patent No.: US 9,794,549 B2
(45) Date of Patent: Oct. 17, 2017

(54) SUBSTRATE, GRATING AND DISPLAY PANEL

(71) Applicant: BOE TECHNOLOGY GROUP CO., LTD., Beijing (CN)

(72) Inventor: Wei Wei, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 14/894,441

(22) PCT Filed: Apr. 20, 2015

(86) PCT No.: PCT/CN2015/076995
§ 371 (c)(1),
(2) Date: Nov. 27, 2015

(87) PCT Pub. No.: WO2016/115784
PCT Pub. Date: Jul. 28, 2016

(65) Prior Publication Data
US 2016/0219271 A1    Jul. 28, 2016

(30) Foreign Application Priority Data

Jan. 19, 2015  (CN) .......................... 2015 1 0025630

(51) Int. Cl.
*H04N 13/04*      (2006.01)
*G02B 27/22*      (2006.01)
*G09G 3/3233*     (2016.01)

(52) U.S. Cl.
CPC ..... *H04N 13/0447* (2013.01); *G02B 27/2214* (2013.01); *H04N 13/0404* (2013.01); *H04N 13/0409* (2013.01); *H04N 13/0422* (2013.01)

(58) Field of Classification Search
CPC .... G02B 5/1842; G02B 5/1885; G02B 5/201; G09G 3/2074
See application file for complete search history.

(56) References Cited

U.S. PATENT DOCUMENTS 6,768,482 B2 *  7/2004  Asano ................. G09G 3/3233
                                                    345/100
7,372,525 B2    5/2008  Liu
(Continued)

FOREIGN PATENT DOCUMENTS

CN         1376014 A      10/2002
CN       101752407 A       6/2010
(Continued)

OTHER PUBLICATIONS

International Search Report & Written Opinon Appln. No. PCT/CN2015/076995; Dated Oct. 10, 2015.
(Continued)

*Primary Examiner* — Obafemi Sosanya
(74) *Attorney, Agent, or Firm* — Ladas & Parry LLP (57) ABSTRACT

A substrate, a grating and a display panel are provided. The substrate comprises a plurality of sub-pixel groups arranged periodically, each of the plurality of sub-pixel groups comprises: a first type of sub-pixel group which is configured for displaying a plurality of viewpoint images and comprises a first sub-pixel unit (201) configured for displaying a first viewpoint image, a second sub-pixel unit (201) configured for displaying a second viewpoint image and a third sub-pixel unit (203) configured for displaying a third viewpoint image; each of the plurality of sub-pixel groups at least comprises a first sub-pixel column and a second sub-pixel columns; and the first sub-pixel unit (201) is located in the first sub-pixel column of each of the plurality of sub-pixel groups, the second sub-pixel unit (202) and the third sub-pixel unit (203) are located in the second sub-pixel column of each of the plurality of sub-pixel groups, the second sub-pixel column and the first sub-pixel column are adjacent to each other and are staggered a preset distance in a vertical direction, and the preset distance is smaller than a width of one sub-pixel unit. Through the arrangement of the sub-pixel (Continued)

units on the substrate, the viewing angle of each viewpoint image is increased, and because within each viewing angle, only the viewpoint image corresponding to the viewing angle can be seen, the interference between different viewpoint images is reduced.

16 Claims, 7 Drawing Sheets

(56) References Cited

U.S. PATENT DOCUMENTS

| | | | |
|---|---|---|---|
| 2014/0016050 A1* | 1/2014 | Huang | G02B 27/2214 349/15 |
| 2015/0130868 A1* | 5/2015 | Feng | G09G 3/2003 345/694 |

FOREIGN PATENT DOCUMENTS

| | | | |
|---|---|---|---|
| CN | 102714000 A | 10/2012 |
| CN | 102736308 A | 10/2012 |
| CN | 202693831 U | 1/2013 |
| CN | 103777393 A | 5/2014 |
| CN | 103916655 A | 7/2014 |
| CN | 104503116 A | 4/2015 |
| JP | 2004-207126 A | 7/2004 |

OTHER PUBLICATIONS

First Chinese Office Action dated Dec. 12, 2016; Appln. No. 201510025630.9.
The Second Chinese Office Action dated May 17, 2017: Appln. No. 201510025630.9.

* cited by examiner

SUBSTRATE, GRATING AND DISPLAY PANEL

TECHNICAL FIELD

Embodiments of the present disclosure relate to a substrate, a grating and a display panel.

BACKGROUND

Figure 1:
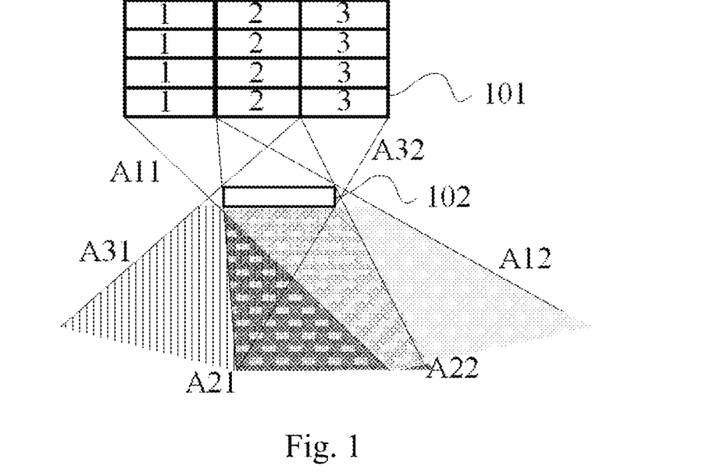
FIG. 1 is a schematic view of viewing angles of a substrate provided in a current multi-view display technology.

With the popularity of a touch tablet computer, a user requirement on a display is getting higher and higher. A part of current tablet computers can realize naked-eye stereoscopic display. For example, a viewpoint image displayed by each sub-pixel column 101 enters a human's eye through a grating 102. But, as illustrated in FIG. 1, a first viewpoint image displayed by a first sub-pixel column can be seen in a first viewing angle region, which is a gray shaded region defined by a line A11 and a line A12, a second viewpoint image displayed by a second sub-pixel column can be seen in a second viewing angle region, which is a display region marked with dots and defined by a line A21 and a line A22, and a third viewpoint image displayed by a third sub-pixel column can be seen in a third viewing angle region, which is a region marked with vertical lines and defined by a line A31 and a line A31. In FIG. 1, 1 stands for a first sub-pixel unit, 2 stands for a second sub-pixel unit, 3 stands for a third sub-pixel unit; however, because the first viewing angle region, the second viewing angle region and the third viewing angle region are very close to each other, and the viewing angle range is limited within the range of 180 degrees, the interference occurs between the viewpoint images, and it can not be achieved that multiple persons view one display.

SUMMARY

Embodiments of the present disclosure provide a substrate, a grating and a display panel, which is capable of increasing the viewing angle of each viewpoint image through the arrangement of the sub-pixel units on the substrate, and reducing the interference between different viewpoint images, because within each viewing angle, only the viewpoint image corresponding to the viewing angle can be seen.

In an aspect, an embodiment of the present disclosure provides a substrate comprising a plurality of sub-pixel groups arranged periodically, wherein each of the plurality of sub-pixel groups comprises: a first type of sub-pixel group which is configured for displaying a plurality of viewpoint images and comprises a first sub-pixel unit configured for displaying a first viewpoint image, a second sub-pixel unit configured for displaying a second viewpoint image and a third sub-pixel unit configured for displaying a third viewpoint image; each of the plurality of sub-pixel groups at least comprises a first sub-pixel column and a second sub-pixel columns; and the first sub-pixel unit is located in the first sub-pixel column of each of the plurality of sub-pixel groups, the second sub-pixel unit and the third sub-pixel unit are located in the second sub-pixel column of each of the plurality of sub-pixel groups, the second sub-pixel column and the first sub-pixel column are adjacent to each other and are staggered a preset distance in a vertical direction, and the preset distance is smaller than a width of one sub-pixel unit.

In another aspect, an embodiment of the present disclosure provides a grating corresponding to the above-mentioned substrate, an opening region of the grating corresponds to the first type of sub-pixel group, and a shape of the opening region of the grating is: a shape formed by a triangle and a quadrilateral, with a side of the triangle coinciding with a side of the quadrilateral; or, a shape formed by two triangles, with a vertex of one of the triangles coinciding with a side of the other one of the triangles.

An embodiment of the present disclosure provides a display panel, and the display panel includes the above-mentioned substrate and a corresponding grating arranged above the substrate.

BRIEF DESCRIPTION OF THE DRAWINGS

In order to clearly illustrate the technical solution of the embodiments of the invention, the drawings of the embodiments will be briefly described in the following; it is obvious that the described drawings are only related to some embodiments of the invention and thus are not limitative of the invention.

DETAILED DESCRIPTION

In order to make objects, technical details and advantages of the embodiments of the invention apparent, the technical solutions of the embodiment will be described in a clearly and fully understandable way in connection with the drawings related to the embodiments of the invention. It is obvious that the described embodiments are just a part but not all of the embodiments of the invention. Based on the described embodiments herein, those skilled in the art can obtain other embodiment(s), without any inventive work, which should be within the scope of the invention.

Embodiments of the present disclosure provides a substrate, a grating and a display panel, by changing arrangement of sub-pixels on the substrate, the viewing angle of each viewpoint image is increased, and because within each viewing angle region, only the viewpoint image corresponding to the viewing angle region can be seen, it can not be affected by viewpoint images displayed by other viewing angle regions.

The technical solutions in the embodiments will be described in a clearly and fully understandable way in connection with the drawings related to the embodiments of the disclosure. Apparently, the described embodiments are just a part but not all of the embodiments of the disclosure. Based on the described embodiments herein, those skilled in the art can obtain other embodiment(s), without any inventive work, which should be within the scope of the disclosure.

An embodiment of the present disclosure provides a substrate including a plurality of sub-pixel groups arranged periodically, each sub-pixel group includes a plurality of sub-pixel units and each sub-pixel group includes a first type of sub-pixel group configured for displaying a plurality of viewpoint images.

The substrate provided by an embodiment of the present disclosure will be explained below in conjunction with the accompanying drawings and implementations. As shown in the drawings, a first sub-pixel unit 1, a second sub-pixel unit 2, a third sub-pixel unit 3 and a fourth sub-pixel unit 4 belong to the first type of sub-pixel unit, and a sub-pixel unit displaying a preset gray value, such as black or white, belong to a second type of sub-pixel unit.

Figure 2:
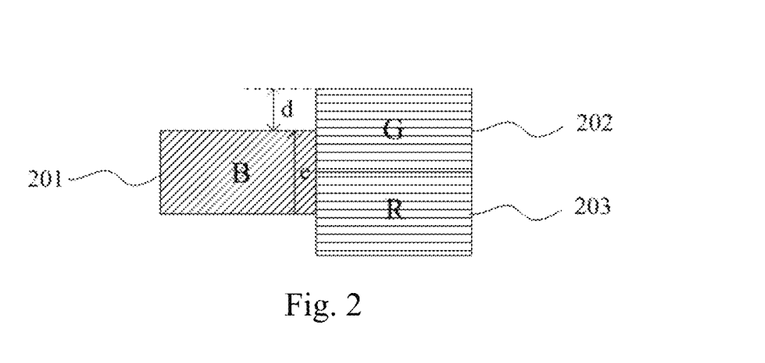
FIG. 2 is a structural schematic view of sub-pixel units corresponding to a substrate provided by a first embodiment of the present disclosure.

Referring to FIG. 2, a first embodiment of the present disclosure provides a substrate, when each sub-pixel group in the substrate includes a plurality of a first type of sub-pixel groups for displaying a plurality of viewpoint images and each first type of sub-pixel group includes three first type of sub-pixel units, that is, the first type of sub-pixel groups each include: a first sub-pixel unit 201 configured for displaying a first viewpoint image, a second sub-pixel unit 202 configured for displaying a second viewpoint image and a third sub-pixel unit 203 configured for displaying a third viewpoint image, an exemplary arrangement of the first sub-pixel unit, the second sub-pixel unit and the third exemplary sub-pixel unit on the substrate is as follows.

The first sub-pixel unit 201 is located in a first sub-pixel column, the second sub-pixel unit 202 and the third sub-pixel unit 203 are located in a second sub-pixel column.

The first sub-pixel unit 201 is adjacent to the second sub-pixel unit 202 and also adjacent to the third sub-pixel unit 203.

As illustrated in FIG. 2, the first sub-pixel column is the sub-pixel column marked with oblique lines, and the second sub-pixel column is the sub-pixel column marked with horizontal lines.

The second sub-pixel column and the first sub-pixel column are adjacent to each other, and are staggered a preset distance d in a vertical direction, and the preset distance d is smaller than a width e of one sub-pixel unit.

Figure 3A:
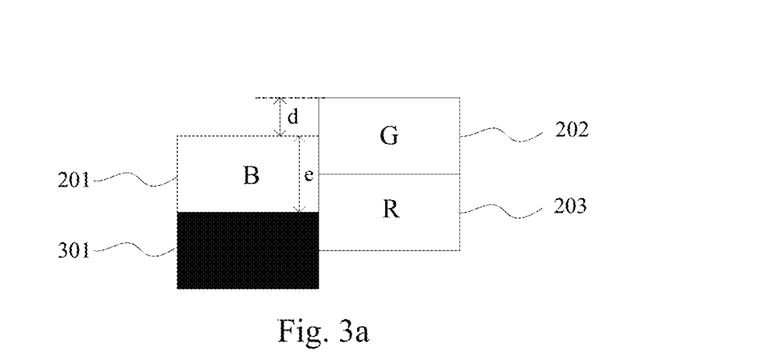
FIG. 3a is a structural schematic view of sub-pixel units corresponding to a substrate provided by the first embodiment of the present disclosure, upon a second type of sub-pixel unit being a black sub-pixel unit.

In order to increase the range of each viewing angle, the each sub-pixel group may also include: a second type of sub-pixel group configured for displaying a preset gray value. Referring to FIG. 3a, when a second type of sub-pixel unit has a preset gray value of zero, i.e. when the second type of sub-pixel unit is a black sub-pixel unit 301, the viewing angle of viewpoint image can be increased correspondingly; and referring to FIG. 3b, when the second type of sub-pixel unit has a maximum preset gray value, i.e., when the second type of sub-pixel unit is a white sub-pixel unit 302, the ambient light for viewing can be increased, and the energy loss can be reduced.

Exemplarily, referring to FIG. 3a and FIG. 3b, when the second type of sub-pixel group includes one second type of sub-pixel unit, i.e., a fifth sub-pixel unit, in each sub-pixel group, an exemplary arrangement of the first sub-pixel unit, the second sub-pixel unit, the third sub-pixel unit and the fifth sub-pixel unit on the substrate is as follows.

The first sub-pixel unit is located in the first sub-pixel column, the second sub-pixel unit and the third sub-pixel unit are located in the second sub-pixel column, and the fifth sub-pixel unit is located in the first sub-pixel column.

The first sub-pixel unit is adjacent to the second sub-pixel unit and also adjacent to the third sub-pixel unit; and the fifth sub-pixel unit is adjacent to the first sub-pixel unit and also adjacent to the third sub-pixel unit.

Figure 3B:
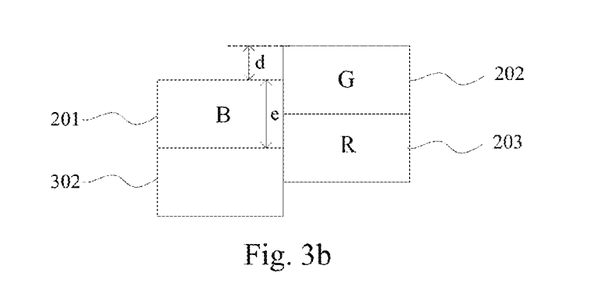
FIG. 3b is a structural schematic view of sub-pixel units corresponding to a substrate provided by the first embodiment of the present disclosure, upon the second type of sub-pixel unit being a white sub-pixel unit.

The arrangements, of the first sub-pixel unit, the second sub-pixel unit, the third sub-pixel unit and the fifth sub-pixel unit, provided by embodiments of the present disclosure are not limited to the arrangement illustrated in FIG. 3a and FIG. 3b. For example, the first type of sub-pixel groups may include a first sub-pixel group, a second sub-pixel group and a third sub-pixel group, the first sub-pixel group includes a plurality of the first sub-pixel units, the second sub-pixel group includes a plurality of the second sub-pixel units, the third sub-pixel group includes a plurality of the third sub-pixel units, the first sub-pixel group is located in the first sub-pixel column, the second sub-pixel group and the third sub-pixel group are located in the second sub-pixel column, the fifth sub-pixel unit is located in the first sub-pixel column; and the first sub-pixel group is adjacent to the second sub-pixel group, and is also adjacent to the third sub-pixel group. Alternatively, the second type of sub-pixel group includes a plurality of the second type of sub-pixel units, for example, when the second type of sub-pixel group includes a fifth sub-pixel unit and a sixth sub-pixel unit, the first sub-pixel unit and the fifth sub-pixel unit are located in the first sub-pixel column; the second sub-pixel unit, the third sub-pixel unit and the sixth sub-pixel unit are located in the second sub-pixel column; the first sub-pixel unit is adjacent to the second sub-pixel unit, and also adjacent to the sixth sub-pixel unit; and the fifth sub-pixel unit is adjacent to the sixth sub-pixel unit and also adjacent to the third sub-pixel unit.

Figure 4:
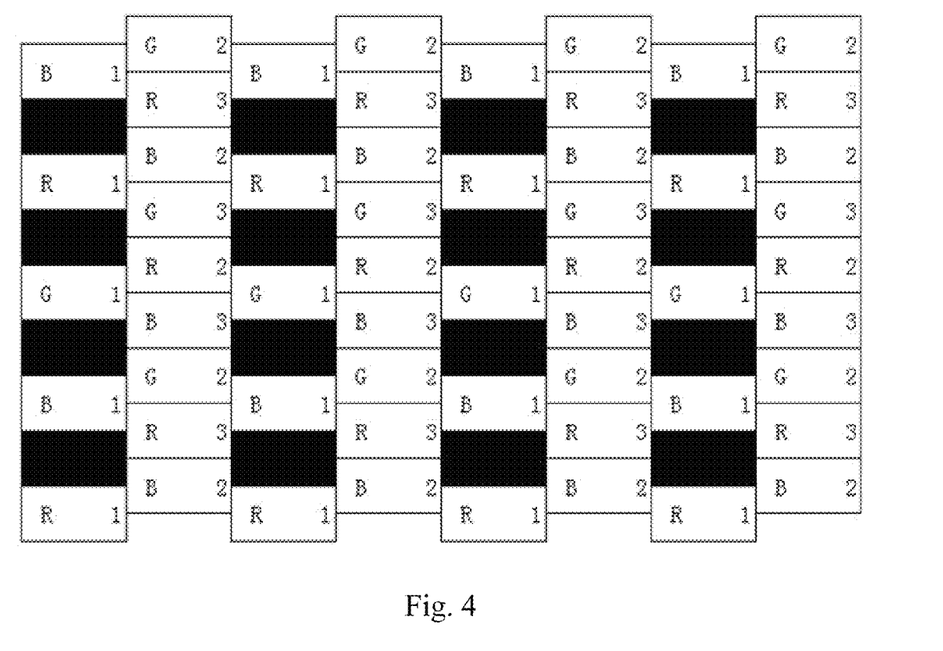
FIG. 4 is a structural substrate of a substrate provided by the first embodiment of the present disclosure.
Figure 5A:
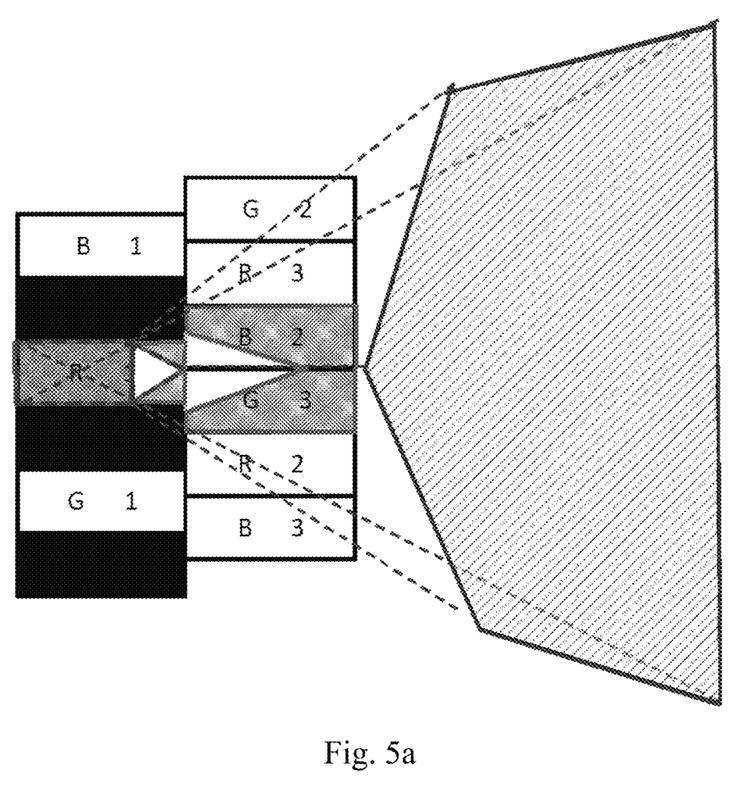
FIG. 5a is a structural schematic view of a first viewing angle region of a substrate provided by the first embodiment of the present disclosure.
Figure 5B:
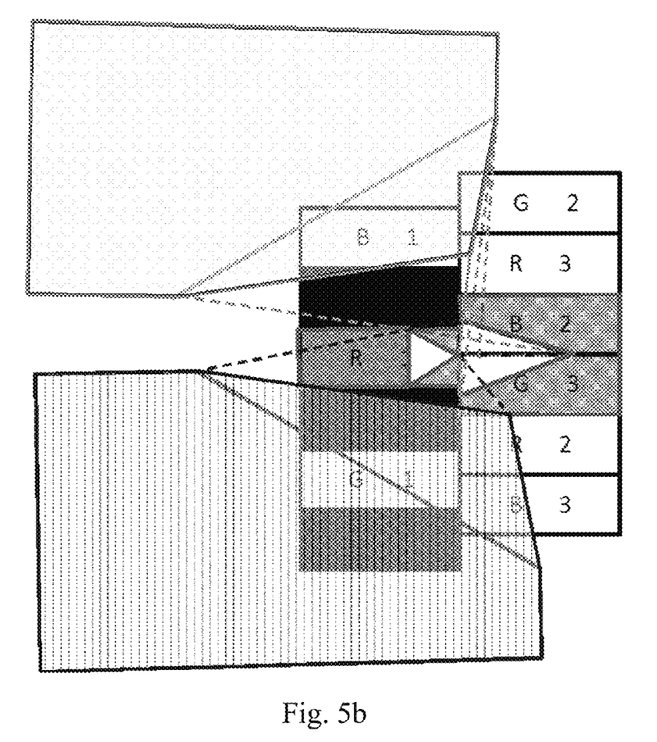
FIG. 5b is a structural schematic view of a second viewing angle region and a third viewing angle region of the substrate provided by the first embodiment of the present disclosure.

Therefore, according to the sub-pixel group illustrated in FIG. 3a, a substrate provided by the first embodiment of the present disclosure may be obtained, as illustrated in FIG. 4. Through the arrangement of the sub-pixel units of the substrate provided in the first embodiment of the present disclosure, it can be achieved that the first viewpoint image is seen within the first viewing angle, the second viewpoint image is seen within the second viewing angle, and the third viewpoint image is seen within the third viewing angle, and the first viewing angle, the second viewing angle and the third viewing angle are all 120 degrees in the horizontal plane. Exemplarily, regions of the viewing angles may be referred to FIG. 5a and FIG. 5b, a region marked with oblique lines in FIG. 5a is the first viewing angle, a region marked with vertical lines in FIG. 5b is the second viewing angle, and a gray region in FIG. 5b is the third viewing angle.

A shape of an opening region of a grating corresponding to the substrate provided by the first embodiment may be: a shape formed by a triangle and a quadrilateral, with a side of the triangle coinciding with a side of the quadrilateral; or, a shape formed by two triangles, with a vertex of one of the triangles coinciding with a side of the other one of the triangles.

Figure 6:
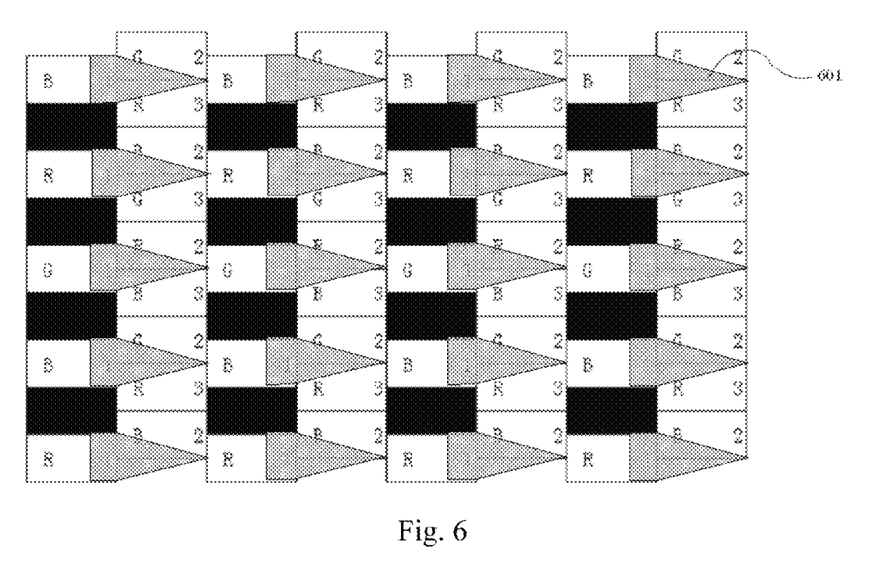
FIG. 6 is a structural schematic view of a grating corresponding to a substrate provided by the first embodiment of the present disclosure.

Exemplarily, when the shape of the opening region of the grating is formed by a triangle and a quadrilateral, a half of the triangle of the opening region of the grating corresponds to the second sub-pixel unit, the other half of the triangle of the opening region of the grating corresponds to the third sub-pixel unit, and the quadrilateral of the opening region of the grating corresponds to the first sub-pixel unit. The relative relationship between the opening region 601 of the grating and the sub-pixel units of the substrate may be referred to FIG. 6.

Exemplarily, when the shape of the opening region of the grating is formed by two triangles, a half of a first triangle of the opening region of the grating corresponds to the second sub-pixel unit, the other half of the first triangle of the opening region of the grating corresponds to the third sub-pixel unit, and a second triangle of the opening region of the grating corresponds to the first sub-pixel unit. The relative relationship between the opening region 701 of the grating and the sub-pixel units of the substrate may be seen in FIG. 7.

Figure 7:
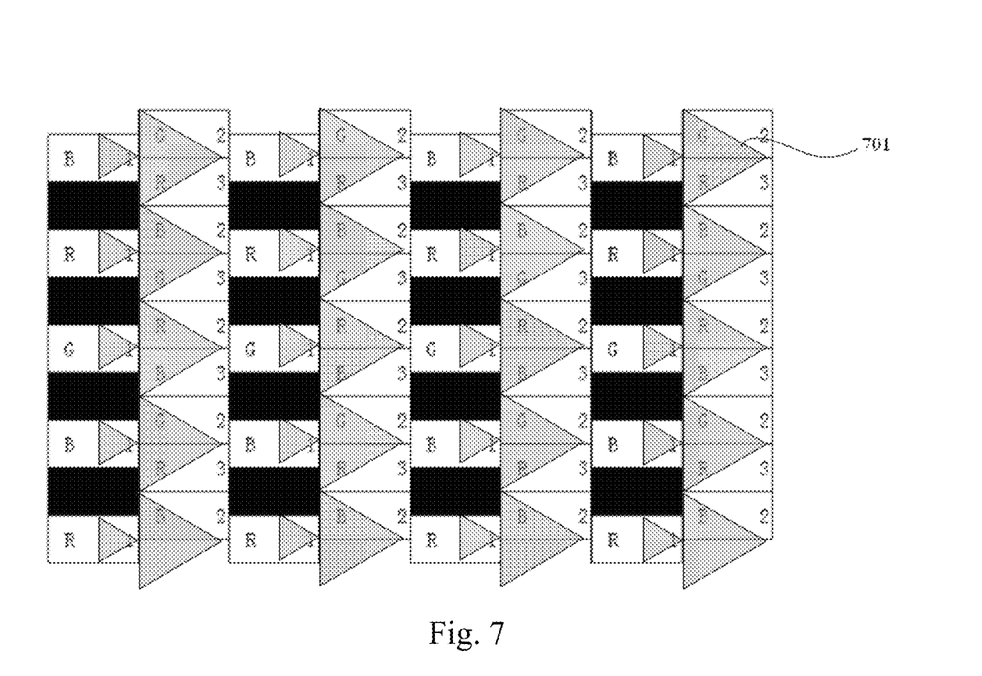
FIG. 7 is a structural schematic view of another grating corresponding to a substrate provided by the first embodiment of the present disclosure.

Through the design of the opening region formed by the two triangles, it can be avoided that the second viewpoint image or the third viewpoint image is seen within the first viewing angle, namely the occurrence of the interference between viewpoint images is avoided.

Exemplarily, the shape of the opening region of the grating is: a shape formed by an equilateral triangle and a quadrilateral, with a side of the triangle coinciding with a side of the quadrilateral; or, a shape formed by an equilateral triangle and a non-equilateral triangle, with a vertex of the non-equilateral triangle coinciding with a side of the equilateral triangle, and with a side of the non-equilateral triangle parallel to the side of the equilateral triangle; or a shape formed by two equilateral triangles, with a vertex of one equilateral triangle coinciding with a side of the other equilateral triangle and with a side of the one equilateral triangle parallel to the side of the other equilateral triangle.

Exemplarily, in the shape formed by an equilateral triangle and a non-equilateral triangle, a vertex of the non-equilateral triangle is located at a center point of a side of the equilateral triangle, and a side of the non-equilateral triangle is parallel to the side of the equilateral triangle; or in the shape formed by two equilateral triangles, a vertex of one equilateral triangle is located at a center point of a side of the other equilateral triangle and a side of the one equilateral triangle is parallel to the side of the other equilateral triangle.

Exemplarily, the quadrilateral may be a rectangle or a square.

Exemplarily, the opening region of the grating may also include a plurality of designs of combinations of the above patterns.

Figure 8:
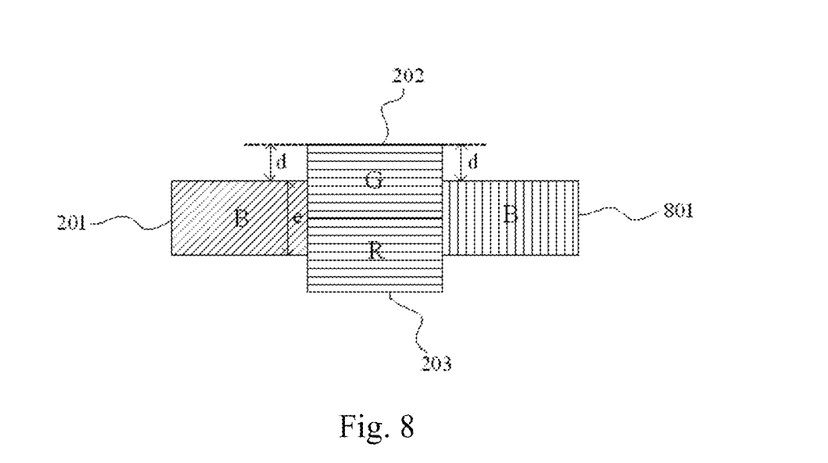
FIG. 8 is a structural schematic view of sub-pixel units corresponding to a substrate provided by a second embodiment of the present disclosure.

Referring to FIG. 8, a second embodiment of the present disclosure provides a substrate, when each sub-pixel group in the substrate includes a plurality of a first type of sub-pixel groups for displaying a plurality of viewpoint images, and the first type of sub-pixel groups each include four first type of sub-pixel units, that is, the first type of sub-pixel groups each further include a fourth sub-pixel unit 801 configured for displaying a fourth viewpoint image, an exemplary arrangement of the first sub-pixel unit 201, the second sub-pixel unit 202, the third sub-pixel unit 203 and the fourth sub-pixel unit 801 on the substrate is as follows.

The first sub-pixel unit 201 is located in the first sub-pixel column, the second sub-pixel unit 202 and the third sub-pixel unit 203 are located in the second sub-pixel column, and the fourth sub-pixel unit 801 is located in the third sub-pixel column.

The first sub-pixel unit 201 is adjacent to the second sub-pixel unit 202 and also adjacent to the third sub-pixel unit 203; and the fourth sub-pixel unit 801 is adjacent to the second sub-pixel unit 202 and also adjacent to the third sub-pixel unit 203.

As shown in FIG. 8, the first sub-pixel column is the sub-pixel column marked with oblique lines, the second sub-pixel column is the sub-pixel column marked with horizontal lines, and the third sub-pixel column is the sub-pixel unit marked with vertical lines.

The second sub-pixel column is located between the first sub-pixel column and the third sub-pixel column, the second sub-pixel column and the first sub-pixel column are staggered a preset distance d in the vertical direction, and similarly, the second sub-pixel column and the third sub-pixel column are staggered the same preset distance d in the vertical direction, and the preset distance d is smaller than the width e of one sub-pixel unit.

The arrangements, of the first sub-pixel unit, the second sub-pixel unit, the third sub-pixel unit and the fourth sub-pixel unit, provided by embodiments of the present disclosure are not limited to the arrangement in the second embodiment. For example, the first type of sub-pixel groups may include a first sub-pixel group, a second sub-pixel group, a third sub-pixel group and a fourth sub-pixel group; the first sub-pixel group includes a plurality of the first sub-pixel units, the second sub-pixel group includes a plurality of the second sub-pixel units, the third sub-pixel group includes a plurality of the third sub-pixel units, and the fourth sub-pixel group includes a plurality of fourth sub-pixel units; the first sub-pixel group is located in the first sub-pixel column, and the second sub-pixel group and the third sub-pixel group are located in the second sub-pixel column; and the fourth sub-pixel group is adjacent to the second sub-pixel group, and also adjacent to the third sub-pixel group. Alternatively, each sub-pixel group in the substrate provided by the second embodiment of the present disclosure further includes a second type of sub-pixel group which includes a plurality of the second type of sub-pixel units, for example, when the second type of sub-pixel group includes a fifth sub-pixel unit and a sixth sub-pixel unit, the first sub-pixel unit, the fourth sub-pixel unit and the fifth sub-pixel unit are located in the first sub-pixel column; the second sub-pixel unit, the third sub-pixel unit and the sixth sub-pixel unit are located in the second sub-pixel column; the fifth sub-pixel unit is located between the first sub-pixel unit and the fourth sub-pixel unit, and the sixth sub-pixel unit is located between the second sub-pixel unit and the third sub-pixel unit.

Figure 9:
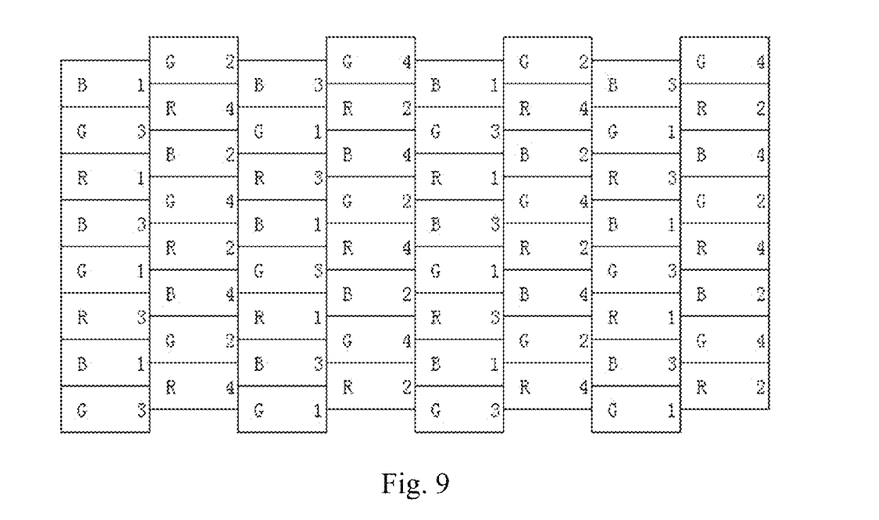
FIG. 9 is a structural schematic view of a substrate provided by the second embodiment of the present disclosure.
Figure 10A:
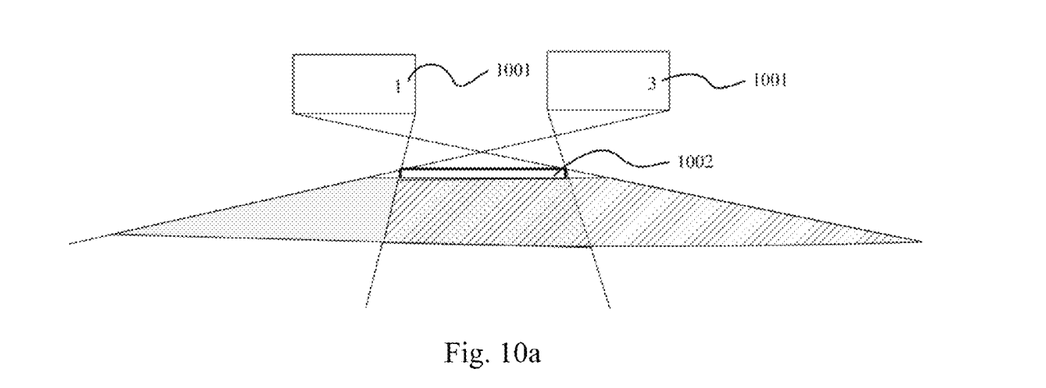
FIG. 10a is a structural schematic view of a first viewing angle region and a third viewing angle region of a substrate provided by the second embodiment of the present disclosure.
Figure 10B:
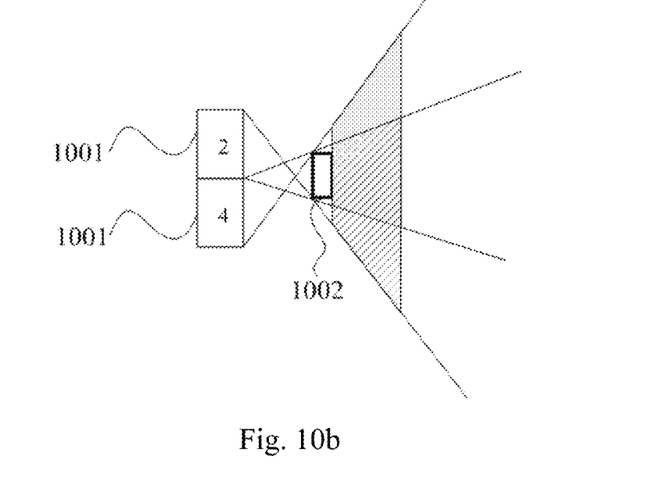
FIG. 10b is a structural schematic view of a second viewing angle region and a fourth viewing angle region of the substrate provided by the second embodiment of the present disclosure.

Therefore, according to the sub-pixel group illustrated in FIG. 8, the substrate provided by the second embodiment of the present disclosure is obtained, as illustrated in FIG. 9. Through the arrangement of the sub-pixel units in FIG. 9, it can be achieved that the first viewpoint image is seen within the first viewing angle, the third viewpoint image is seen within the third viewing angle, the second viewpoint image is seen within the second viewing angle, and the fourth viewpoint image is seen within the fourth viewing angle. Regions of the viewing angles may be referred to FIG. 10*a* and FIG. 10*b*, in which 1001 stands for a sub-pixel unit, and 1002 stands for a grating; a region marked with oblique lines in FIG. 10*a* is the first viewing angle, a gray region in FIG. 10*a* is the third viewing angle, a region marked with oblique lines in FIG. 10*b* is the second viewing angle, and a gray region in FIG. 10*b* is the fourth viewing angle.

Figure 11:
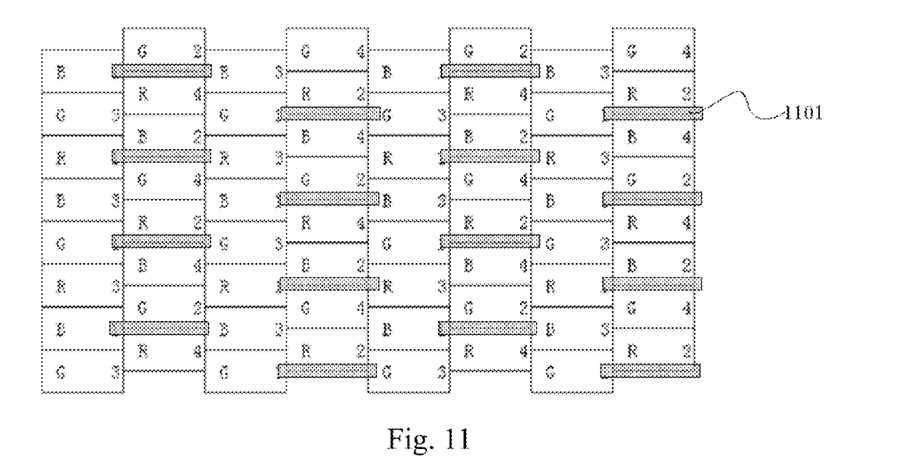
FIG. 11 is a structural schematic view of a grating corresponding to a substrate provided by the second embodiment of the present disclosure.

A shape of an opening region of a grating corresponding to the substrate provided by the second embodiment of the present disclosure may be a quadrilateral 1101. The relative relationship between the opening region of the grating and the sub-pixel units of the substrate may be referred to FIG. 11.

Figure 12:
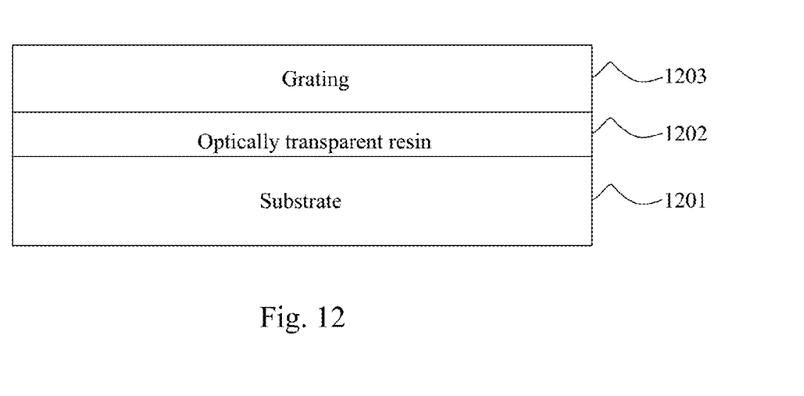
FIG. 12 is a sectional schematic view of a display panel provided by an embodiment of the disclosure.

As illustrated in FIG. 12, in correspondence to the substrate and the grating provided by the first and second embodiments of the present disclosure, an embodiment of the present disclosure further provides a display panel, and the display panel includes: the above-described substrate 1201, the above-mentioned grating 1203 arranged above the substrate, and an optically transparent resin (Optical Clear Resin, OCR) 1202 for bonding the substrate 1201 and the grating 1203.

Exemplarily, the substrate 1201 may be a color filter substrate or an array substrate.

Exemplarily, the display panel further includes a device configured to provide a voltage signal to the first type of sub-pixel group.

In correspondence to the display panel provided by the embodiment of the present disclosure, an embodiment of the present disclosure further provides a display device including the display panel illustrated in FIG. 12.

Exemplarily, the display device may be a liquid crystal display or a plasma display.

Furthermore, an embodiment of the present disclosure further provides a multiple viewing angle displaying method, and the method includes the following steps.

S1301, according to a preset arrangement of viewpoint images, a viewpoint image signal is inputted into sub-pixel units displaying a corresponding viewpoint image.

S1302, based on positions of the sub-pixel units and a best viewing distance, an opening region of a grating and a size of the opening region are determined. In this step, the grating may be a solid state barrier-type grating (barrier) and/or a transparent air-cushion type grating (active barrier) and/or a lenticular lens grating and/or electronic liquid crystal lens (ELC).

S1303, the substrate of S1301 is aligned with and attached to the grating of S1302 precisely.

In summary, embodiments of the present disclosure provide a substrate, a grating and a display panel, to increase the viewing angle of each viewpoint image, and within each viewing angle, only the viewpoint image corresponding to the viewing angle can be seen, without the influence of viewpoint images displayed by other viewing angles; by allowing each sub-pixel group to include a plurality of sub-pixel units configured for displaying a plurality of viewpoint images, the viewing angles of viewpoint images in different directions are increased; and by separately adding a second type of sub-pixel unit, which only displays a gray value rather than a viewpoint image, to each sub-pixel group, the interference phenomenon between images is reduced upon the displayed images being viewed from different directions.

It is apparent to those skilled in the art to make various modifications and variations to the present disclosure without departing from the spirit and scope of the present disclosure. In this way, if these modifications and variations belong to the scope of the claims of the present disclosure and their equivalents, then the present disclosure is intended to cover these modifications and variations.

This application claims the benefit of Chinese Patent Application No. 201510025630.9, fled on Jan. 19, 2015, which is hereby entirely incorporated by reference as a part of the present application.

What is claimed is:

1. A grating corresponding to a substrate, the substrate, comprising a plurality of sub-pixel groups arranged periodically, wherein each of the plurality of sub-pixel groups comprises: a first type of sub-pixel group which is configured for displaying a plurality of viewpoint images and comprises a first sub-pixel unit configured for displaying a first viewpoint image, a second sub-pixel unit configured for displaying a second viewpoint image and a third sub-pixel unit configured for displaying a third viewpoint image;

each of the plurality of sub-pixel groups at least comprises a first sub-pixel column and a second sub-pixel columns; and the first sub-pixel unit is located in the first sub-pixel column of each of the plurality of sub-pixel groups, the second sub-pixel unit and the third sub-pixel unit are located in the second sub-pixel column of each of the plurality of sub-pixel groups, the second sub-pixel column and the first sub-pixel column are adjacent to each other and are staggered a preset distance in a vertical direction, and the preset distance is smaller than a width of one sub-pixel unit, wherein an opening region of the grating corresponds to the first type of sub-pixel group, and a shape of the opening region of the grating is: a shape formed by a triangle and a quadrilateral, with a side of the triangle coinciding with a side of the quadrilateral or, a shape formed by two triangles, with a vertex of one of the triangles coinciding with a dies of the other one of the triangles, under a condition that the shape of the opening region of the grating is the shape formed by the triangle and the quadrilateral, a part of the triangle of the opening region of the grating corresponds to the second sub-pixel unit, the rest part of the triangle of the opening region of the grating corresponds to the third sub-pixel unit, and the quadrilateral of the opening region of the grating corresponds to the first sub-pixel unit.

2. The grating according to claim 1, wherein each of the plurality of sub-pixel groups further comprises: a second type of sub-pixel group configured for displaying a preset gray value.

3. The grating according to claim 2, wherein the second type of sub-pixel group comprises a fifth sub-pixel unit, wherein the fifth sub-pixel unit is located in the first sub-pixel column, and adjacent to the first sub-pixel unit and the third sub-pixel unit.

4. The substrate grating according to claim 1, wherein the first type of sub-pixel group further comprises: a fourth sub-pixel unit configured for displaying a fourth viewpoint image;
  each of the plurality of sub-pixel groups further comprises: a third sub-pixel column adjacent to the second sub-pixel column;
  the fourth sub-pixel unit is located in the third sub-pixel column, and the third sub-pixel column and the second sub-pixel column are staggered the preset distance in the vertical direction.

5. The grating according to claim 4, wherein each of the plurality of sub-pixel groups further comprises a second type of sub-pixel group configured for displaying a preset gray value, the second type of sub-pixel group comprises a fifth sub-pixel unit and a sixth sub-pixel unit, the first sub-pixel unit, the fourth sub-pixel unit and the fifth sub-pixel unit are located in the first sub-pixel column; the second sub-pixel unit, the third sub-pixel unit and the sixth sub-pixel unit are located in the second sub-pixel column; and the fifth sub-pixel unit is located between the first sub-pixel unit and the fourth sub-pixel unit, and the sixth sub-pixel unit is located between the second sub-pixel unit and the third sub-pixel unit.

6. A grating corresponding to a substrate, the substrate, comprising a plurality of sub-pixel groups arranged periodically, wherein each of the plurality of sub-pixel groups comprises: a first type of sub-pixel group which is configured for displaying a plurality of viewpoint images and comprises a first sub-pixel unit configured for displaying a first viewpoint image, a second, sub-pixel unit configured for displaying a second viewpoint image and a third sub-pixel unit configured for displaying a third Viewpoint image;
  each of the plurality of sub-pixel groups at least comprises a first sub-pixel column and a second sub-pixel columns; and
  the first sub-pixel unit is located in the first sub-pixel column of each of the plurality of sub-pixel groups, the second sub-pixel unit and the third sub-pixel unit are located hi the second sub-pixel column of each of the plurality of sub-pixel groups, the second sub-pixel column and the first sub-pixel column, are adjacent to each other and are staggered a preset distance in a vertical direction, and the preset distance is smaller than a width of one sub-pixel unit,
  wherein an opening region of the grating corresponds to the first type of sub-pixel group, and a shape of the opening region of the grating is: a shape formed by a triangle and a quadrilateral, with a side of the triangle coinciding with a side of the quadrilateral; or, a shape formed by two triangles, with a vertex of one of the triangles coinciding with a side of the other one of the triangles,
  under a condition that the shape of the opening region of the grating is the shape formed by the two triangles, a part of a first triangle of the opening region of the grating corresponds to the second sub-pixel unit, the ret part of the first triangle of the opening region of the grating corresponds to the third sub-pixel unit, and a second triangle of the opening region of the grating corresponds to the first sub-pixel unit.

7. A display panel, comprising:
a substrate, comprising a plurality of sub-pixel groups arranged periodically, wherein each of the plurality of sub-pixel groups comprises: a first type of sub-pixel group which is configured for displaying a plurality of viewpoint images and comprises a first sub-pixel unit configured for displaying a first viewpoint image, a second sub-pixel unit configured for displaying a second viewpoint image and a third sub-pixel unit configured for displaying a third viewpoint image;
  each of the plurality of sub-pixel groups at least comprises a first sub-pixel column and a second sub-pixel columns; and
  the first sub-pixel unit is located in the first sub-pixel column of each of the plurality of sub-pixel groups, the second sub-pixel unit and the third sub-pixel unit are located in the second sub-pixel column of each of the plurality of sub-pixel groups, the second sub-pixel column and the first sub-pixel column are adjacent to each other and are staggered a preset distance in a vertical direction, and the preset distance is smaller than a width of one sub-pixel unit; and
a grating, corresponding to the substrate,
wherein an opening region of the grating corresponds to the first type of sub-pixel group, and a shape of the opening region of the grating is: a shape formed by a triangle and a quadrilateral, with a side of the triangle coinciding with a side of the quadrilateral; or, a shape formed by two triangles, with a vertex of one of the triangles coinciding with a side of the other one of the triangles,
under a condition that the shape of the opening region of the grating is the shape formed by the triangle and the quadrilateral, a part of the triangle of the opening region of the grating corresponds to the second sub-pixel unit, the rest part of the triangle of the opening region of the grating corresponds to the third sub-pixel unit, and the quadrilateral of the opening region of the grating corresponds to the first sub-pixel unit.

8. A display panel, comprising:
a substrate, comprising a plurality of sub-pixel groups arranged periodically, wherein each of the plurality of sub-pixel groups comprises: a first type of sub-pixel group which is configured for displaying a plurality of viewpoint images and comprises a first sub-pixel unit configured for displaying a first viewpoint image, a second sub-pixel unit configured for displaying a second viewpoint image and a third sub-pixel unit configured for displaying a third viewpoint image;
  each of the plurality of sub-pixel groups at least comprises a first sub-pixel column and a second sub-pixel columns; and
  the first sub-pixel unit is located in the first sub-pixel column of each of the plurality of sub-pixel groups, the second sub-pixel unit and the third sub-pixel unit are located in the second sub-pixel column of each of the plurality of sub-pixel groups, the second sub-pixel column and the first sub-pixel column are adjacent to each other and are staggered a preset distance in a vertical direction, and the preset distance is smaller than a width of one sub-pixel unit,
  wherein the first type of sub-pixel group further comprises: a fourth sub-pixel unit configured for displaying a fourth viewpoint image, each of the plurality of sub-pixel groups further comprises: a third sub-pixel column adjacent to the second sub-pixel column, and the fourth sub-pixel unit is located in the third sub-pixel column, and the third sub-pixel column and the second sub-pixel column are staggered the preset distance in the vertical direction; and
a grating, corresponds to the substrate, wherein an opening region of the grating corresponds to the first type of sub-pixel group, and a shape of the opening region of the grating is: a shape formed by a triangle and a quadrilateral, with a side of the triangle coinciding with a side of the quadrilateral; or, a shape formed by two triangles, with a vertex of one of the triangles coinciding with a side of the other one of the triangles, under a condition that the shape of the opening region of the grating is the shape formed by the triangle and the quadrilateral, a part of the triangle of the opening region of the grating corresponds to the second sub-pixel unit, the rest part of the triangle of the opening region of the grating corresponds to the third sub-pixel unit, and the quadrilateral of the opening region of the grating corresponds to the first sub-pixel unit.

9. The display panel according to claim 7, further comprising a device configured for providing a voltage signal to the first type of sub-pixel group.

10. The display panel according to claim 8, further comprising a device configured for providing a voltage signal to the first type of sub-pixel group.

11. The grating according to claim 6, wherein each of the plurality of sub-pixel groups further comprises: a second type of sub-pixel group configured for displaying a preset gray value.

12. The grating according to claim 11, wherein the second type of sub-pixel group comprises a fifth sub-pixel unit,
wherein the fifth sub-pixel unit is located in the first sub-pixel column, and adjacent to the first sub-pixel unit and the third sub-pixel unit.

13. The grating according to claim 6, wherein the first type of sub-pixel group further comprises: a fourth sub-pixel unit configured for displaying a fourth viewpoint image;
each of the plurality of sub-pixel groups further comprises: a third sub-pixel column adjacent to the second sub-pixel column;
the fourth sub-pixel unit is located in the third sub-pixel column, and the third sub-pixel column and the second sub-pixel column are staggered the preset distance in the vertical direction.

14. The grating according to claim 13, wherein each of the plurality of sub-pixel groups further comprises a second type of sub-pixel group configured for displaying a preset gray value, the second type of sub-pixel group comprises a fifth sub-pixel unit and a sixth sub-pixel unit, the first sub-pixel unit, the fourth sub-pixel unit and the fifth sub-pixel unit are located in the first sub-pixel column; the second sub-pixel unit, the third sub-pixel unit and the sixth sub-pixel unit are located in the second sub-pixel column; and the fifth sub-pixel unit is located between the first sub-pixel unit and the fourth sub-pixel unit, and the sixth subs pixel unit is located between the second sub-pixel unit and the third sub-pixel unit.

15. A display panel, comprising:
a substrate, comprising a plurality of sub-pixel groups arranged periodically, wherein each of the plurality of sub-pixel groups comprises: a first type of sub-pixel group which is configured for displaying a plurality of viewpoint images and comprises a first sub-pixel unit configured for displaying a first viewpoint image, a second sub-pixel unit configured for displaying a second viewpoint image and a third sub-pixel unit configured for displaying a third viewpoint image;
each of the plurality of sub-pixel groups at least comprises a first sub-pixel column and a second sub-pixel columns; and
the first sub-pixel unit is located in the first sub-pixel column of each of the plurality of sub-pixel groups, the second stab-pixel unit and the third sub-pixel unit are located in the second sub-pixel column of each of the plurality of sub-pixel groups, the second sub-pixel column and the first sub-pixel column are adjacent to each other and are staggered a preset distance in a vertical direction, and the preset distance is smaller than a width of one sub-pixel unit; and
a grating, corresponding to the substrate,
wherein an opening region of the grating corresponds to the first type of sub-pixel group, and a shape of the opening region of the grating is: a shape formed by a triangle and a quadrilateral, with a side of the triangle coinciding with a side of the quadrilateral; or, a shape formed by two triangles, with a vertex of one of the triangles coinciding with a side of the other one of the triangles,
under a condition that the shape of the opening region of the grating is the shape formed by the two triangles, a part of a first triangle of the opening region of the grating corresponds to the second sub-pixel unit, the rest part of the first triangle of the opening region of the grating corresponds to the third sub-pixel unit, and a second triangle of the opening region of the grating corresponds to the first sub-pixel unit.

16. A display panel, comprising:
a substrate, comprising a plurality of sub-pixel groups arranged periodically, wherein each of the plurality of sub-pixel groups comprises: a first type of sub-pixel group which is configured for displaying a plurality of viewpoint images and comprises a first sub-pixel unit configured for displaying a first viewpoint image, a second sub-pixel unit configured for displaying a second viewpoint image and a third sub-pixel unit configured for displaying a third viewpoint image;
each of the plurality of sub-pixel groups at least comprises a first sub-pixel column and a second sub-pixel columns; and
the first sub-pixel unit is located in the first sub-pixel column of each of the plurality of sub-pixel groups, the second sub-pixel unit and the third sub-pixel unit are located in the second sub-pixel column of each of the plurality of sub-pixel groups, the second sub-pixel column and the first sub-pixel column are adjacent to each other and are staggered a preset distance in a vertical direction, and the preset distance is smaller than a width of one sub-pixel unit, wherein the first type of sub-pixel group further comprises: a fourth sub-pixel unit configured for displaying a fourth viewpoint image, each of the plurality of sub-pixel groups further comprises: a third sub-pixel column adjacent to the second sub-pixel column, and the fourth sub-pixel unit is located in the third sub-pixel column, and the third sub-pixel column and the second sub-pixel column are staggered the preset distance in the vertical direction; and
a grating, corresponds to the substrate,
wherein an opening region of the grating corresponds to the first type of sub-pixel group, and a shape of the opening region of the grating is: a shape formed by a triangle and a quadrilateral, with a side of the triangle coinciding with a side of the quadrilateral; or, a shape formed by two triangles, with a vertex of one of the triangles coinciding with a side of the other one of the triangles, under a condition that the shape of the opening region of the grating is the shape formed by the two triangles, a part of a first triangle of the opening region of the grating corresponds to the second sub-pixel unit, the rest part of the first triangle of the opening region of the grating corresponds to the third sub-pixel unit, and a second triangle of the opening region of the grating corresponds to the first sub-pixel unit.

\* \* \* \* \*